United States Patent [19]

Barris et al.

[11] Patent Number: 4,650,506
[45] Date of Patent: Mar. 17, 1987

[54] MULTI-LAYERED MICROFILTRATION MEDIUM

[75] Inventors: Marty A. Barris, Eagan; Richard L. Zelinka, Maplewood, both of Minn.

[73] Assignee: Donaldson Company, Inc., Minneapolis, Minn.

[21] Appl. No.: 832,961

[22] Filed: Feb. 25, 1986

[51] Int. Cl.⁴ .............................................. B01D 39/04
[52] U.S. Cl. ....................................... 55/487; 55/528; 210/505; 210/508
[58] Field of Search ............................... 55/486–488, 55/528; 210/491, 505, 508

[56] References Cited

U.S. PATENT DOCUMENTS

| | | |
|---|---|---|
| 2,689,199 | 9/1954 | Pesce ................... 55/528 X |
| 3,068,873 | 12/1962 | Allman, Jr. et al. ............. 55/528 X |
| 3,565,979 | 2/1971 | Palmer . |
| 3,573,158 | 3/1971 | Pall et al. ........................ 210/505 X |
| 4,011,067 | 3/1977 | Carey, Jr. ........................ 55/487 X |
| 4,041,203 | 8/1977 | Brock et al. . |
| 4,042,740 | 8/1977 | Krueger . |
| 4,043,331 | 8/1977 | Martin et al. . |
| 4,081,582 | 3/1978 | Butterworth et al. . |
| 4,091,140 | 5/1978 | Harmon . |
| 4,093,437 | 6/1978 | Ichihara et al. ................... 55/528 X |
| 4,143,196 | 3/1979 | Simm et al. . |
| 4,196,245 | 4/1980 | Kitson et al. . |
| 4,223,101 | 9/1980 | Fine et al. . |
| 4,302,495 | 11/1981 | Marra . |
| 4,331,730 | 5/1982 | Sorenson . |
| 4,370,187 | 1/1983 | Katagiri et al. . |
| 4,370,289 | 1/1983 | Sorenson . |
| 4,379,192 | 4/1983 | Wahlquist et al. . |
| 4,426,417 | 1/1984 | Meitner et al. . |
| 4,440,819 | 4/1984 | Rosser et al. . |
| 4,597,784 | 7/1986 | Albrecht et al. ................... 55/486 X |

Primary Examiner—Kathleen J. Prunner
Attorney, Agent, or Firm—Merchant, Gould, Smith, Edell, Welter & Schmidt

[57] ABSTRACT

A multilayered microfiltration medium exhibiting high particle capture efficiency and minimal flow restriction having a base substrate layer, a fine fiber filtration or efficiency layer deposited on and adhered to the substrate layer and a nonhandleable, non-self-supporting protective cover layer which is self-adhering to the fine fiber layer and has a very smooth outer surface. Suitable cover layer materials include polystyrene and polycarbonate fibers.

21 Claims, 4 Drawing Figures

MULTI-LAYERED MICROFILTRATION MEDIUM

TECHNICAL FIELD

The present invention pertains generally to the field of fiber type media for the filtration of fluids. The media includes three main fibrous layers which together provide high particle capture efficiency at minimal flow restriction for gas or liquid filtration.

BACKGROUND

Filtration media are widely used in industry in various forms for the filtration and removal of particles from fluid such as air, hydraulic fluid, etc. In response to increasing demands from industry and government for higher degrees of filtration, filtration media have been developed having smaller fiber size for trapping a smaller class of particles from the fluid. An important class of filtration media is non-woven fibrous materials. This type of filtration media generally consists of a matrix or mass of fine diameter fibers, with the fibers sufficiently close to each other and in a sufficiently thick layer so that the interfiber spacing or effective pore size is small enough to trap the particles of the desired size range for the application of the filter. The filter media are then fabricated into the desired form for the particular application, i.e., panels, pleated cartridges, flat disks, and canisters, etc., as is generally known in the art.

In making non-woven fine fiber filter media, a variety of materials have been used, including fiberglass, metals, ceramics, and a wide range of polymer materials. Fibers have been formed by a variety of techniques including forcing the materials through fine capillaries or openings, either as melted material or in a solution that is subsequently evaporated. Formation of a filtration layer of solution-blown polymeric microfibers is disclosed in U.S. Pat. No. 4,011,067. Fibers have also been formed by "spinning" fibers through the use of "spinnerets" of the type long used in the textile industry for the manufacture of synthetic fiber, and electrostatic spinning. In electrostatic spinning fibers are formed as they leave a nozzle or capillary and are attracted to a collection zone by the high voltage electrostatic field contained in the apparatus. (See U.S. Pat. No. 4,143,196)

Developments in the art of producing fine fibers have resulted in the production of fibers having micron or submicron diameters, and this in turn has permitted the formation of filter media fiber matrices capable of filtering submicron particles more effectively.

Thin non-supporting layers of filtration media have been deposited on self-supporting base layers forming multilayered filter media. One such multilayered filter media is disclosed in previously referenced U.S. Pat. No. 4,011,067.

To protect and further support the thin filtration layer a top protective layer may be provided. In existing multilayered filter media this top layer is generally much thicker than the filtration layer and is laminated or affixed with adhesive over the thin filtration layer. Cover layers of this type are susceptible to release of fibers to the surrounding environment; add undesirable restriction to fluid flow through the media; add undesirable thickness to the resulting media and require the application of adhesive and/or pressing together of the cover layer and filtration layer.

In certain environments, such as the computer field in general, and hard or "Winchester" disk drives in particular, an extremely high degree of filtration is required. Particulate matter which becomes lodged between the disk and the magnetic read/write head which "flies" only a few microns or less above the disk on an air cushion can destroy the disk drive unit; therefore, flaking and chafing of the filter media must be absolutely minimized. Realizing that hard disk drive units are sealed for life, providing a filter media having a smooth outer surface which does not exhibit flaking or sloughing of media fibers is highly desirable.

Therefore, a need exists for a multilayered fiber media having a smooth, thin self-adhering protective outer layer which improves durability and performance without increasing the flow restriction of the overall media.

SUMMARY OF THE INVENTION

The present invention provides an improved multilayered microfiltration media. The filter media of the present invention includes a self-supporting highly permeable substrate layer which provides support structure for the media and has a low relative efficiency and low relative flow restriction, a thin, non-self-supporting efficiency layer of fine fibers, and a smooth nonhandleable, non-self-supporting protective cover layer of fibers which is self adhering to the efficiency layer and adds negligible efficiency and flow restriction to the overall media. The three layer microfiltration media is characterized by high particle capture efficiency and minimal flow restriction.

Because the protective cover layer is not laminated or affixed with adhesive to the efficiency layer, glueing and/or pressing the efficiency layer and protective layer together is eliminated. Further, using methods known in the art, the thin cover layer can be deposited on the media in a manner providing a cover layer no more than 1-2 fibers thick.

The thin non-self-supporting cover layer of the present invention makes possible a multilayered filter media which exhibits a number of advantageous features not previously seen in traditional filter media. These include: a higher efficiency with a lower flow restriction (e.g. when compared to traditional glass media of equal efficiency this media will have a lower restriction by approximately a factor of 2); a high degree of durability, such as abrasion and pleat scoring resistance; a smoother outer surface lacking loose fibers due to the continual nature of the cover layer fibers; a non-shedding fine fiber layer due to its nearly continuous nature; and a smooth protected surface without the detriments of added thickness and flow restriction. The present invention provides an overall thinner media allowing use of more media area per unit volume, thereby reducing the velocity through the media. Reducing the velocity through the media improves the media efficiency and reduces the flow restriction.

These and various other advantages and features of novelty which characterize the invention are pointed out with particularity in the claims annexed hereto and forming a part hereof. However, for a better understanding of the invention, its advantages, and objects attained by its use, reference should be had to the drawings which form a further part hereof, and of the accompanying descriptive matter, in which there is illustrated and described a preferred embodiment of the invention.

DESCRIPTION OF THE INVENTION

DETAILED DESCRIPTION OF THE INVENTION

Figure 1:
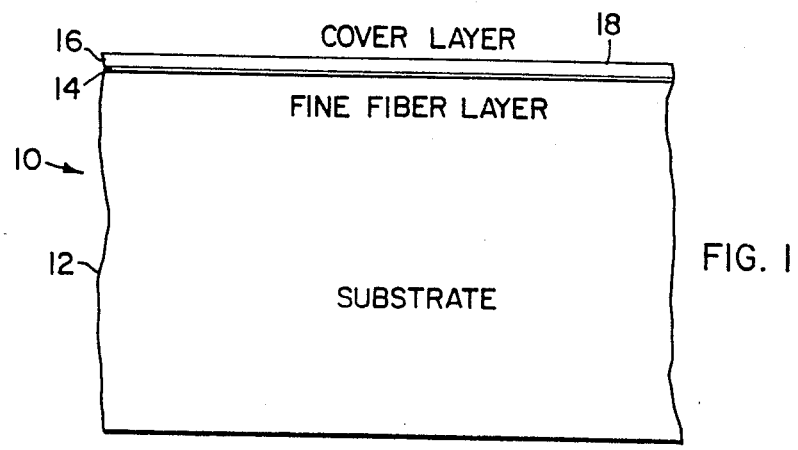
FIG. 1 is a fragmentary, diagrammatic representation in cross section of an embodiment of the filter media of the present invention.
Figure 2:
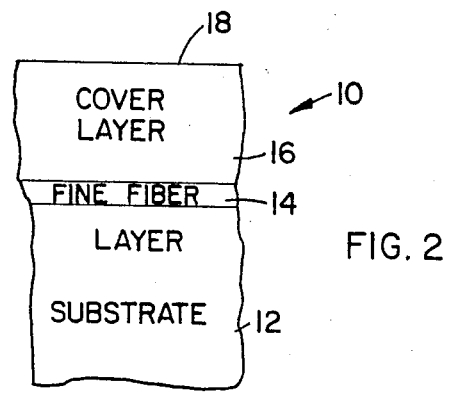
FIG. 2 is an enlargement of the fragmentary diagrammatic represenation in FIG. 1.

As mentioned above, the present invention provides a unique multilayered fiber filter media characterized by both a very thin filter or efficiency layer and a nonhandleable, non-self-supporting protective cover layer which is self-adhering to the efficiency layer. The cover layer is also characterized by a very smooth outer surface. FIGS. 1 and 2 are diagrammatic representations of a cross section of a preferred embodiment of the filter media according to the present invention. The relative dimensions of each layer are best represented in FIG. 2 and the cell model of FIG. 3.

Figure 3:
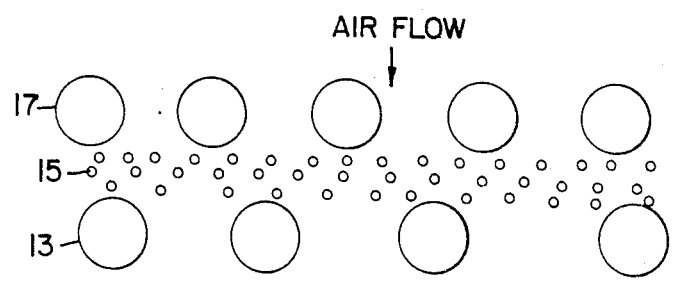
FIG. 3 is a schematic drawing showing a cell model of a section of a filter media according to the present invention.

As shown in FIGS. 1 and 2 the multilayer filter media 10 is comprised of three layers: a preformed, highly permeable substrate 12; a fine fiber filter or efficiency layer 14; and a protective cover layer 16. The size of the efficiency layer 14 relative to the cover layer 16 is best shown in the diagrammatic enlargement of the filter media shown in FIG. 2. In FIG. 3 the relative size of the substrate fibers 13, fine fibers 15 and cover layer fibers 17 are shown.

The substrate 12 provides the structure for the overall media 10 by supplying sufficient strength and pleatability. As previously indicated, the substrate 12 is preformed and highly permeable. Permeability can range from 150 to 800 ft./min. at one-half inch of water. Permeability of 300 ft./min. is typical. The structure of the substrate is self-supporting and handleable. The substrate surfaces are smooth with mean fiber extension typically not exceeding 250 microns. The smooth surface provides a base for attachment of other fiber layers, such as the fine fiber efficiency layer 14 of the present invention. The substrate 12 has a low relative efficiency and flow restriction, typically less then 20% of the efficiency and flow restriction of the total media 10 of the present invention. The typical efficiency of the substrate when exposed to nominal 0.3 micron dioctylphthalate (DOP) particles at 5.33 cm/sec (10.5 ft/min) is about 5% with a flow restriction of approximately 0.02 inches of water.

The substrate material exhibits the following general physical characteristics: fiber diameter about 10 to 20 microns; thickness about 125 to 1000 microns (0.005 inches to 0.040 inches); and basis weight about 0.0018 to 0.015 gm/cm$^2$ (0.5 to 4 oz./yd$^2$, 10 to 80 lbs./3000 ft$^2$). The substrate layer 12 of the present invention can be made by various means known to one skilled in the art, including air laying and wet laying. A preferred substrate material is polyester, although other appropriate synthetic or natural fibers may also be used.

The fine fiber filter or efficiency layer 14 of the present invention is deposited onto a surface of the substrate 12 and is self-adhering thereto. The efficiency layer 14 is generally not handleable or self-supporting except for layers thicker than 50 microns. The fine fiber layer is responsible for the majority of the overall media efficiency and flow restriction. It is appreciated that the overall media efficiency and flow restriction will depend in large part on the thickness of the efficiency layer 14. Increasing the thickness of the efficiency layer provides greater capture of submicron contaminant particles. The desired thickness of the efficiency layer 14 of the present invention will depend on the intended use for the media produced. The relative thickness of the efficiency layer 14 to the other layers 12, 16 of a multilayered media in accordance with the present invention is best shown in FIG. 2. When exposed to nominal 0.3 micron DOP particles at 5.33 cm/sec (10.5 ft/min) it is possible for the fine fiber layer 14 efficiency to range from about 5% to about 99.9999% with a flow restriction ranging from about 0.005 inches of water to about 2.0 inches of water.

The efficiency layer 14 can be formed and deposited on the substrate layer 12 by various known methods including melt blowing, solution blowing and electrostatic spinning. For example, forming the efficiency layer 14 on the substrate 12 can be accomplished by known electrostatic spinning processes such as described in U.S. Pat. No. 4,043,331 to Martin et al.; U.S. Pat. No. 4,143,196 to Simm et al.; and U.S. Pat. No. 3,565,979 to Palmer. It will be appreciated that the thickness of the fiber layer deposited on the collecting media can be controlled by varying the electrostatic spinning apparatus parameters (i.e. solids content of polymer solution, target distance, emitter speed etc.). For example, by increasing or slowing the advance rate of the collecting media more or less emitted fibers can be deposited on the forming media.

The number of efficiency layers applied to the substrate surface using any of the above techniques can be varied to produce a fine fiber layer exhibiting desired efficiency and flow restriction characteristics. An efficiency layer 14 having several layers of fine fibers 15 is illustrated in FIG. 3.

The fibers that comprise the efficiency layer 14 of the present invention 10 have a diameter of less than one-half micron. The thickness of a typical efficiency layer in accordance with the present invention ranges from about 0.2 to 80 microns with a basis weight ranging from about 0.6 to 240 micrograms/cm$^2$ (0.0002 to 0.072 oz/yd$^2$, 0.004 to 1.6 lb./3000 ft$^2$). Filter media of the present invention can be used as high efficiency particulate air media (HEPA) of the type used in surgical operating rooms, clean rooms, 14 inch diameter hard disk drives, and gas line filtration. The efficiency layer thickness of a HEPA media in accordance with the present invention ranges from about 50 to 80 microns with a basis weight ranging from about 300 to 600 micrograms/cm$^2$ (0.1 to 0.2 oz/yd$^2$, 2 to 4 lb/3000 ft$^2$) and an efficiency in excess of 99.97%. Microfiltration media of the present invention can also be used in hard or "Winchester" disk drives in which case the efficiency layer has a preferred thickness ranging from about 2.5–15 microns with a basis weight ranging from about 15 to 90 micrograms/cm$^2$ (0.005 to 0.03 oz/yd$^2$, 0.1 to 0.6 lb/3000 ft$^2$) and an efficiency of about 90%. It will be appreciated that microfiltration media having thinner efficiency layers may be appropriate for various prefiltration processes and heating, ventilation, air conditioning (HVAC) applications.

One preferred efficiency layer material is polyacrylonitrile. Suitable polyacrylonitrile is commercially available from E.I. Dupont de Nemours Co, Wilmington Del., as polyacrylonitrile Type A. Another suitable synthetic polymer for the efficiency layer 14 is polyvinylidene chloride. Suitable polyvinylidene chloride is commercially available from Dow Chemicals, Midland, Mich. as Saran ® F-150. Other suitable synthetic polymeric fibers that can be used for the efficiency layer 14 include polysulfone, sulfonated polysulfone, polyimide, polyvinylidene fluoride, polyvinyl chloride, chlorinated polyvinyl chloride, polycarbonate, nylon, aromatic nylons, cellulose esters, ayrlate, polystyrene, polyvinyl butyral, and copolymers of each of these polymers.

A key feature of the multilayer filter media of the present invention is a relatively thin and permeable protective cover layer 16 formed and deposited on the surface of the efficiency layer 14. The cover layer 16 forms a protective barrier for the fine fibers of the efficiency layer 14 and provides surprising durability to the overall media 10. Unlike common scrim material, the cover layer 16 of the present invention is not handleable, self-supporting, or preformed. Further, the thin cover layer 16 adheres to the efficiency layer 14 without adhesives or lamination. The very smooth outer surface 18 of the cover layer 16 is another important aspect of the present invention.

The protective cover layer 16 is formed of fibers having a diameter from about 5 to 30 microns. The thickness of a typical cover layer in accordance with the present invention is from about 5 to 60 microns and the basis weight is from about 0.04 to 0.5 milligrams/cm$^2$ (0.2-3.0 lbs./3000 ft$^2$). Preferably, the cover layer thickness is from about 10 to 40 microns. The volume fraction of solids of the cover layer 16 is less than 10%. It will be appreciated that a cover layer 16 having the above-mentioned properties adds negligible efficiency and flow restriction to the overall media 10. When the cover layer 16 is exposed to nominal 0.3 micron DOP particles at 5.33 cm/sec (10.5 ft./min.) the efficiency attributable to the cover layer 16 is less than 0.1% and the flow restriction is less than 0.001 inches of water.

Preferably, the thickness of the protective layer 16 is about 1-2 fibers. In the cell model of FIG. 3, the protective cover layer 16 is seen as a single layer of fibers 17. A cover layer of about 1-2 fibers in thickness minimizes the cover layer 16 efficiency and restriction to flow.

The protective cover layer 16 may be formed by several of the same methods used to form the efficiency layer 14 (i.e. melt blowing, solution blowing, and electrostatic solution spinning); however, electrostatic spinning is preferred. A preferred embodiment of the present media 10 includes a cover layer 16 formed of polycarbonate fibers, Polycarbonate suitable for forming the cover layer 16 is available from Mobay Chemical Corp., Pittsburg P.A. as Merlon ® M-50-F. Another suitable polymer cover layer is polystyrene, commercially available from Monsanto Industries Chemical Co., St. Louis, MO. as LUSTREX ® 103-202 and 103-327. Other polymers that can be used for the cover layer 16 include, cellulose esters, polysulfone, sulfonated polysulfone, polyvinylidene fluoride, polyimide, polyvinyl chloride, chlorinated polyvinyl chloride, polyvinylidene chloride, nylon, aromatic nylons, ayrlate, polyacrylonitrile, and copolymers of each of these polymers.

Both polycarbonate and polystyrene produce the very smooth and very thin cover layer which characterizes the durable multilayered media of the present invention. Further, polycarbonate and polystyrene fibers adhere well to the various efficiency layer fibers described herein without the need for additional adhesives or laminating substances. This is especially true when polycarbonate fibers are deposited onto an efficiency layer 14 composed of polyacrylonitrile fibers.

Figure 4:
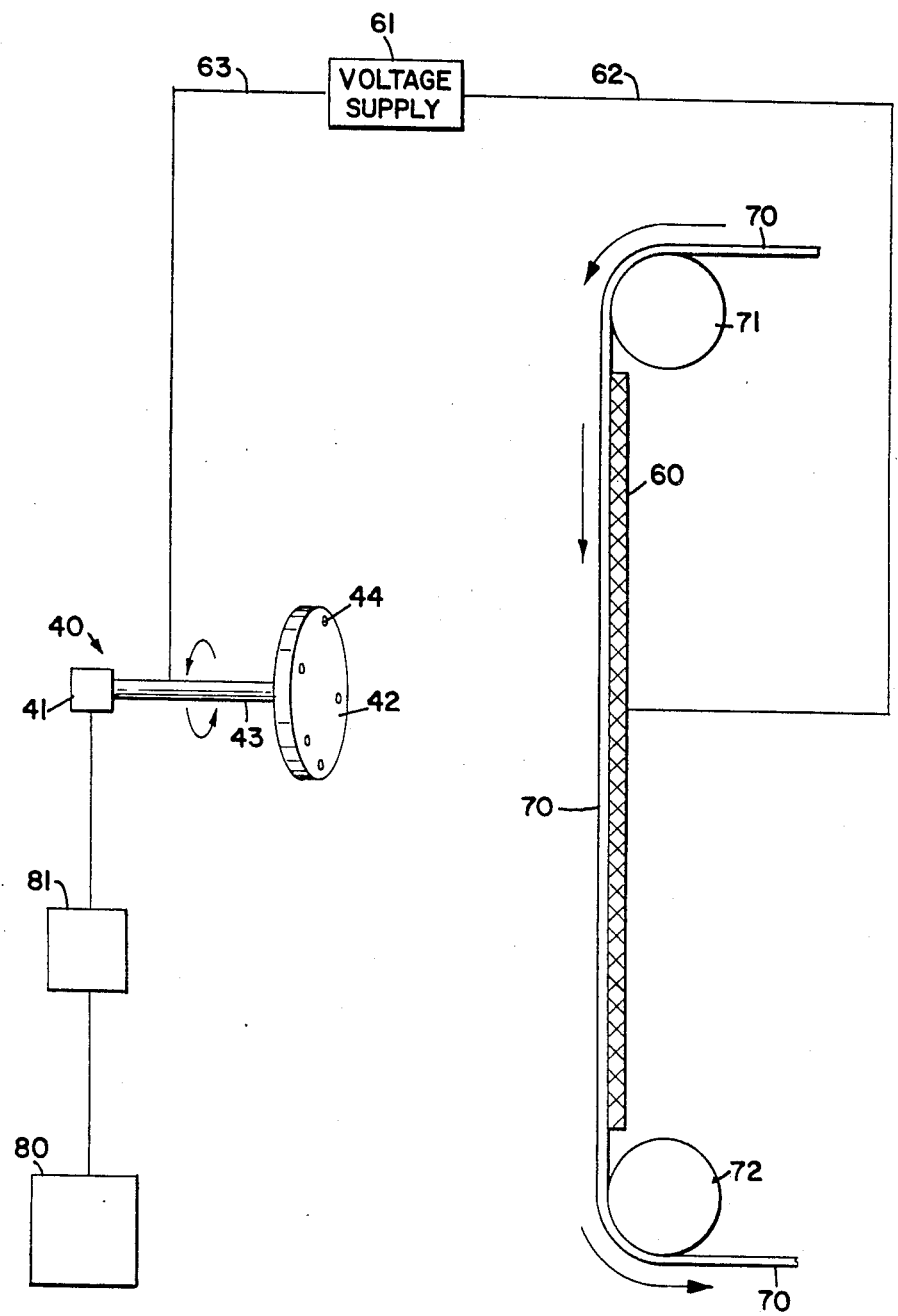
FIG. 4 is an illustration of an electrostatic spinning apparatus useful to prepare a filter media of the present invention.

As mentioned above, the efficiency layer 14 and cover layer 16 can be formed by a number of known methods including solution-blowing; melt blowing; and electrostatic spinning. In the preferred embodiments described herein, both the efficiency layer 14 and cover layer 16 are formed by the electrostatic spinning process. A suitable apparatus for forming the efficiency layer 14 and cover layer 16 is illustrated in FIG. 4. This apparatus includes a reservoir 80 in which the fine fiber forming polymer solution is contained, a pump 81 and a rotary type emitting device or emitter 40 to which the polymeric solution is pumped. The emitter 40 generally consists of a rotating union 41, a forward facing portion 42 including a plurality of offset holes 44 and a hollow shaft 43 connecting the forward facing portion and the rotating union. The rotating union 41 provides for introduction of the polymer solution to the forward facing portion 42 through the hollow shaft 43. The holes 44 are spaced around the periphery of the forward facing portion 42.

Facing the emitter 40, but spaced apart therefrom, is a substantially planar grid 60 upon which the collecting media 70 (i.e. substrate 12 or combined substrate and efficiency layer 14) is positioned. The collecting media 70 is passed around rollers 71 and 72 which are positioned adjacent opposite ends of grid 60. A high voltage electrostatic potential is maintained between emitter 40 and grid 60 by means of a suitable electrostatic voltage source 61 and connections 62 and 63 which connect respectively to the grid 60 and emitter 40.

In use, the polymer solution is pumped to the rotating union 41 from reservoir 80. The forward facing portion 42 rotates while liquid exits from holes 44 and moves from the outer edge of the emitter toward collecting media 70 positioned on grid 60. Specifically, the electrostatic potential between grid 60 and the emitter 40 imparts a charge to the material which cause liquid to be emitted therefrom as thin fibers which are drawn toward grid 60 where they arrive and are collected on substrate 12 or an efficiency layer 14. In the case of the polymer in solution, solvent is evaporated off the fibers during their flight to the grid 60; therefore, the fibers arrive at the substrate 12 or efficiency layer 14 in a still somewhat tacky condition and bond to the fibers first encountered at the grid 60. It will be appreciated that by increasing or slowing the advance rate of the collecting media more or less emitted fibers can be deposited on the forming media, thereby allowing control of the thickness of each layer deposited thereon.

The apparatus in FIG. 4 may be used to apply both the efficiency layer 14 and cover layer 16 of the present invention with a single emitter and separate passes of the forming media across the grid. Alternatively, use of a second rotary emitter positioned upstream from a first emitter provides for the sequential depositing of the efficiency layer 14 and cover layer 16 during a single pass of the forming media across grid 60.

EXAMPLE I

Table 1 summarizes pertinent characteristics of polyacrylonitrile and polyvinylidene chloride fiber efficiency layers formed on a base substrate using the electrostatic spinning apparatus of FIG. 4 and the stated apparatus parameters. In each case the substrate was an approximately 0.025 inch thick polyester web of 20 micron polyester fibers.

The efficiency of particle capture and flow restriction properties of each of the media produced were determined. In each case an aerosol generator formed a stream of 0.3 micron DOP particles that were forced through a flat four inch disk of the media at a rate of 10.5 feet per minute. The efficiency of each media was measured by the difference in the upstream and downstream particle concentrations. A pressure transducer attached to the media sample concurrently measured the flow restriction exhibited by the media.

EXAMPLE II

Table 2 summarizes pertinent characteristics of polycarbonate and polystryene cover layers formed on a base substrate using the electrostatic spinning apparatus of FIG. 4. Both of these cover layers were deposited on the polyester substrate material described in Example 1 above in accordance with the apparatus parameters set forth in Table 2. In the case of both polycarbonate and polystyrene, cover layers having a thickness of about 1-2 fibers were produced.

The efficiency and flow restriction characteristics of each media were examined in the same manner as described in Example 1. Accordingly, multiple measurements of efficiency and flow restriction of the substrate alone were made. The substrate exhibited an efficiency and flow restriction of about 5% and about 0.02 inches of water respectively. The difference between the observed efficiency and flow restriction of the substrate/cover layer media and the efficiency and flow restriction of the substrate alone represents the efficiency and flow restriction attributable to the cover layer. Only the increase in efficiency and flow restriction attributable to the cover layer alone are reported in Table 2. In the case of both polycarbonate and polystyrene, the cover layers produced were very smooth as compared to traditional filter media.

EXAMPLES III-VII

Five multilayered media were prepared by depositing the polycarbonate cover layer of Example II onto the polyacrylonitrile layer of each polyacrylonitrile/polyester media of Example I. In each case, the polycarbonate cover layer of Example II was added to the polyacrylonitrile/polyester media in the same manner that the polycarbonate layer was deposited on the polyester substrate alone in Example II.

EXAMPLES VIII-XII

Five multilayered media where prepared by depositing the polystyrene cover layer of Example II onto the polyacrylonitrile layer of each polyacrylonitrile/polyester media of Example I. In each case, the polystyrene cover layer of Example II was added to the polyacrylonitrile/polyester media in the same manner that the polystyrene layer was deposited on the substrate alone in Example II.

TABLE 1

| | | | EFFICIENCY LAYERS DEPOSITED ON POLYESTER SUBSTRATE | | | | |
|---|---|---|---|---|---|---|---|
| POLYMER | SOLVENT | SOLIDS (wt %) | SOLUTION FLOW RATE TO EMITTER (ml/min) | TARGET DISTANCE (In) | EMITTER VOLTAGE (kV) | EMITTER SPEED (RPM) | RELATIVE HUMIDITY (%) |
| polyacrylonitrile (Dupont Type A) | dimethyl formamide | 5 | 1.5 | 8 | 88 | 1250 | 45 |
| polyacrylonitrile (Dupont Type A) | dimethyl formamide | 5 | 1.5 | 8 | 88 | 1250 | 45 |
| polyacrylonitrile (Dupont Type A) | dimethyl formamide | 5 | 1.5 | 8 | 88 | 1250 | 45 |
| polyacrylonitrile (Dupont Type A) | dimethyl formamide | 6 | 1.5 | 8 | 88 | 1250 | 45 |
| polyacrylonitrile (Dupont Type A) | dimethyl formamide | 4 | 1.5 | 8 | 88 | 1250 | 45 |
| polyvinylidene chloride (Dow Chemical Saran ® F-150) | methyl ethyl ketone | 7 | 1.25 | 6 | 40 | 1000 | 50 |

| POLYMER | SOLVENT | TEMPERATURE (DEG. F.) | EFFICIENCY* OF MEDIA (%) | DELTA $P$** OF MEDIA (In. H20) | FIBER SIZE (micron) | LAYER THICKNESS (microns) |
|---|---|---|---|---|---|---|
| polyacrylonitrile (Dupont Type A) | dimethyl formamide | 75 | 99 | .38 | .15 | 12–15 |
| polyacrylonitrile (Dupont Type A) | dimethyl formamide | 75 | 88 | .17 | .15 | 5–7 |
| polyacrylonitrile (Dupont Type A) | dimethyl formamide | 75 | 60 | .075 | .15 | 2.5–4.0 |
| polyacrylonitrile (Dupont Type A) | dimethyl formamide | 75 | 55 | .076 | .20 | 3.5–5.0 |
| polyacrylonitrile (Dupont Type A) | dimethyl formamide | 75 | 65 | .075 | .10 | 1.1–2.0 |
| polyvinylidene chloride (Dow Chemical Saran ® F-150) | methyl ethyl ketone | 70 | 60 | .10 | .15 | 1.5–2.5 |

*(using 0.3 micron DOP particles at 10.5 fpm)
**(at 10.5 fpm)

TABLE 2

| | | | COVER LAYERS DEPOSITED ON POLYESTER SUBSTRATE | | | | |
|---|---|---|---|---|---|---|---|
| POLYMER | SOLVENT | SOLIDS (wt %) | SOLUTION FLOW RATE TO EMITTER (ml/min) | TARGET DISTANCE (In) | EMITTER VOLTAGE (kV) | EMITTER SPEED (RPM) | RELATIVE HUMIDITY (%) |
| polycarbonate (Mobay Merlon ® M-50-F) | methylene chloride | 12 | 3 | 8 | 88 | 100 | 45 |
| polystyrene (Monsanto LUSTREX ® 103-202 and 103-327) | methylene chloride | 12.5 | 4 | 8 | 88 | 250 | 39 |

| POLYMER | SOLVENT | TEMPERATURE (DEG. F.) | EFFICIENCY* OF MEDIA (%) | DELTA P** OF MEDIA (In. H20) | FIBER SIZE (micron) | LAYER THICKNESS (microns) |
|---|---|---|---|---|---|---|
| polycarbonate (Mobay Merlon ® M-50-F) | methylene chloride | 75 | <0.1 | <.001 | 20 | 20-40 |
| polystyrene (Monsanto LUSTREX ® 103-202 and 103-327) | methylene chloride | 79 | <0.1 | <.001 | 13 | 13-26 |

*(using 0.3 micron DOP particles at 105 fpm; only efficiency and change of pressure attributable to cover layer reported)
**(at 10.5 fpm)

The efficiency and flow restriction attributable to the substrate of Example I was about 5% and 0.02 inches of water respectively. Table 1, therefore, demonstrates that the efficiency or fine fiber layer is responsible for the majority of the overall efficiency and flow restriction of the media. Table 2 shows that thin, approximately one fiber thick polycarbonate and polystyrene cover layers produce negligible increases in media efficiency and flow restriction.

When the polycarbonate cover layer was added to the polyacrylonitrile efficiency layers of various thickness (Examples III-VII) the polycarbonate cover layer exhibited the same efficiency and flow restriction qualities as set forth in Table 2. Addition of a 20 micron polycarbonate cover layer to each of the polyacrylonitrile/polyester media of Example I increased the total efficiency of each media less than 0.1%. The total flow restriction increase resulting from the addition of the polycarbonate cover layer to each polyacrylonitrile/polyester media of Example I was less than 0.001 inches of water. The cover layer of these multilayered media exhibited a surprisingly very smooth and durable outer surface in each case.

When a 13 micron cover layer of polystyrene was added to the various polyacrylonitrile efficiency layers of Example I (Examples VIII-XII) the polystyrene cover layer exhibited substantially the same efficiency and flow restriction qualities as set forth in Table 2. Specifically, the addition of the polystyrene layer to the polyacrylonitrile/polyester media increased the total media efficiency less than 0.1% and increased the media restriction to flow by less than 0.001 inches of water. The cover layer in each case (Examples VIII-XII) exhibited a very smooth and durable outer surface similar to that in Examples III-VII.

From the foregoing it will be seen that the present invention provides a multilayered filter media having a unique nonhandleable, non-self-supporting protective cover layer which is self-adhering to a fine fiber filter layer and has a very smooth outer surface. The cover layer can be as thin as approximately a single fiber thickness, thereby improving the durability of the overall media without added efficiency and flow restriction.

What is claimed is:

1. A handleable, self-supporting and durable multilayered microfiltration medium having a high particle capture efficiency and minimal flow restriction comprising: a self-supporting porous substrate layer having a fine fiber filtration layer deposited on and adhering thereto; and a porous nonhandleable fiber cover layer deposited on and adhering to said filtration layer, said cover layer being about one to two fibers thick and completely self-adhering to said filtration layer.

2. A multilayered microfiltration medium in accordance with claim 1 wherein said filtration layer fibers are formed from polyacrylonitrile.

3. A multilayered microfiltration medium in accordance with claim 1 wherein said filtration layer fibers are formed from polyvinylidene chloride.

4. A multilayered microfiltration medium according to claim 1 wherein said cover layer has a very smooth outer surface.

5. A multilayered microfiltration medium in accordance with claim 1 wherein said filtration layer fibers have a diameter less than 0.5 micron and said filtration layer has a thickness from about 0.2 to 80 microns and a basis weight from about 0.6 to 240 micrograms/cm$^2$.

6. A multilayered microfiltration medium in accordance with claim 1 wherein said cover layer fibers have a diameter from about 5 to 30 microns and said cover layer has a thickness from about 5 to 60 microns and a basis weight from about 0.04 to 0.5 milligrams/cm$^2$.

7. A multilayered microfiltration medium according to claim 1 wherein said cover layer increases said capture efficiency of said medium less than about 0.1% and increases said flow restriction of said medium less than 0.001 inches of water.

8. A multilayered microfiltration medium in accordance with claim 1 wherein said cover layer fibers are formed from polycarbonate.

9. A multilayered microfiltration medium in accordance with claim 1 wherein said cover layer fibers are formed from polystyrene.

10. A handleable, self-supporting and durable multilayered microfiltration medium having a high particle capture efficiency and minimal flow restriction comprising:

a self-supporting highly permeable substrate layer, said substrate layer providing a support structure for said medium and having a low relative efficiency and low relative flow restriction;

a thin efficiency layer of fine fibers having a diameter less than about 0.5 micron, said efficiency layer deposited on and adhering to said substrate layer and having a thickness from about 0.2 to 80 microns and a basis weight from about 0.6 to 240 micrograms/cm$^2$; and a nonhandleable, non-self-supporting protective cover layer of fibers having a diameter from about 5 to 30 microns, said cover layer formed and deposited on said efficiency layer and having a thickness from about 5 to 60 microns and a basis weight from about 0.04 to 0.5 millidrams/cm$^2$, said cover layer being self-adhering to said efficiency layer.

11. A multilayered microfiltration medium according to claim 10 wherein said cover layer has a smooth outer surface.

12. A multilayered microfiltration medium according to claim 10 wherein said cover layer increases said capture efficiency of said medium less than about 0.1% and increases said flow restriction of said medium less than about 0.001 inches of water.

13. A multilayered microfiltration medium in accordance with claim 10 wherein said efficiency layer fibers are formed from polyacrylonitrile.

14. A multilayered microfiltration medium in accordance with claim 10 wherein said efficiency layer fibers are formed from polyvinylidene chloride.

15. A multilayered microfiltration medium in accordance with claim 10 wherein said cover layer fibers are formed from polycarbonate.

16. A multilayered microfiltration medium in accordance with claim 10 wherein said cover layer fibers are formed from polystyrene.

17. A handleable, self-supporting and durable multilayered microfiltration medium having a high particle capture efficiency and minimal flow restriction comprising:

a self-supporting highly permeable substrate layer, said substrate layer providing support structure for said medium and having a low relative efficiency and low relative flow restriction, said substrate layer contributing no more than about 20% of the medium's total efficiency and flow restriction;

a thin, non-self-supporting efficiency layer of fine fibers having a diameter less than 0.5 micron, said efficiency layer deposited on and adhering to said substrate layer and having a thickness from about 0.2 to 80 microns and a basis weight from about 0.6 to 240 micrograms/cm$^2$; and a non-handleable, non-self-supporting protective cover layer of fibers having a diameter from about 5 to 30 microns, said cover layer having a thickness from about 5 to 60 microns, a basis weight from about 0.04 to 0.5 milligrams/cm$^2$ and a volume fraction of solids of less than 10%, said cover layer formed and deposited on said efficiency layer, said cover layer being nonlaminated and self-adhering to said efficiency layer and having a very smooth outer surface, said cover layer increasing said capture efficiency of said medium less than about 0.1% and increasing said flow restriction of said medium less than about 0.001 inches of water.

18. A multilayered microfiltration medium in accordance with claim 17 wherein said efficiency layer fibers are formed from polyacrylonitrile.

19. A multilayered microfiltration medium in accordance with claim 17 wherein said efficiency layer fibers are formed from polyvinylidene chloride.

20. A multilayered microfiltration medium in accordance with claim 18 wherein said cover layer fibers are formed from polycarbonate.

21. A multilayered microfiltration medium in accordance with claim 18 wherein said cover layer fibers are formed from polystyrene.

* * * * *

UNITED STATES PATENT AND TRADEMARK OFFICE
CERTIFICATE OF CORRECTION

PATENT NO. :   4,650,506
DATED      :   March 17, 1987
INVENTOR(S) :  Marty A. Barris and Richard L. Zelinka It is certified that error appears in the above-identified patent and that said Letters Patent is hereby corrected as shown below:

Column 4, line 49, delete "oz/yd$^2$" and insert --oz./yd$^2$--.

Column 5, line 3, after "Wilmington" insert --,--.

Table 1, under the heading "Delta$^P$ of Media", delete "(ln. H2O)" and insert --(ln. H$_2$O)--.

Table 2, under the heading "Delta$^P$ of Media", delete (ln. H2O)" and insert --(ln. H$_2$O)--.

Table 2, after "*(using 0.3 micron DOP particles at", delete "105 fpm" and insert --10.5 fpm--.

Column 12, line 4, after "providing", insert --a--.

Signed and Sealed this

Twenty-ninth Day of December, 1987

Attest:

DONALD J. QUIGG

*Attesting Officer*      *Commissioner of Patents and Trademarks*